(12) United States Patent
Stowe et al.

(10) Patent No.: US 8,614,742 B2
(45) Date of Patent: Dec. 24, 2013

(54) MINIATURE LOW COST PAN/TILT MAGNETIC ACTUATION FOR PORTABLE AND STATIONARY VIDEO CAMERAS

(75) Inventors: Timothy D. Stowe, Alameda, CA (US); Dirk De Bruyker, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1303 days.

(21) Appl. No.: 11/759,184

(22) Filed: Jun. 6, 2007

(65) Prior Publication Data

US 2008/0303900 A1 Dec. 11, 2008

(51) Int. Cl.
*H04N 9/47* (2006.01)
(52) U.S. Cl.
USPC .................................. 348/143; 348/61
(58) Field of Classification Search
USPC ..................... 348/61, 143; 396/427
See application file for complete search history.

(56) References Cited

U.S. PATENT DOCUMENTS

| | | | | |
|---|---|---|---|---|
| 4,906,083 A * | 3/1990 | Sattler | | 359/386 |
| 5,945,898 A * | 8/1999 | Judy et al. | | 335/78 |
| 6,320,610 B1 * | 11/2001 | Van Sant et al. | | 348/143 |
| 6,356,308 B1 | 3/2002 | Hovanky | | |
| 6,461,021 B1 | 10/2002 | Warnecke | | |
| 6,483,610 B1 * | 11/2002 | Burns | | 358/474 |
| 6,632,373 B1 | 10/2003 | Rosa et al. | | |
| 6,715,940 B2 | 4/2004 | Top et al. | | |
| 6,880,987 B2 | 4/2005 | Diana et al. | | |
| 7,071,591 B2 | 7/2006 | Hovanky et al. | | |
| 7,101,095 B2 | 9/2006 | Kajino et al. | | |
| 2004/0047623 A1 * | 3/2004 | Top et al. | | 396/427 |
| 2005/0206781 A1 | 9/2005 | Sawada | | |

FOREIGN PATENT DOCUMENTS

| | | |
|---|---|---|
| CA | 1 341 295 C | 9/2001 |
| EP | 0 671 697 A1 | 9/1995 |
| EP | 1 536 267 A1 | 6/2005 |
| EP | 1 538 457 A2 | 6/2005 |
| JP | 2001275096 A | 10/2001 |
| WO | WO 97/45878 A1 | 12/1997 |
| WO | WO 02/30108 A1 | 4/2002 |

OTHER PUBLICATIONS

Ayers et al. "360° Rotating Micro Mirror for Transmitting and Sensing Optical Coherence Tomography Signals," IEEE Proceedings of Sensors 2004, pp. 497-500.

Bernstein et al. "Magnetic Two-Axis Micromirror for OCT Endoscopy," Solid-State Sensors, Actuators, and Microsystems Workshop, pp. 7-10, Jun. 2006.

(Continued)

*Primary Examiner* — Umar Cheema
(74) *Attorney, Agent, or Firm* — Bever, Hoffman & Harms, LLP; Patrick T. Bever

(57) ABSTRACT

A pan/tilt apparatus for a camera includes a base, a stage mounted on the base to rotate around a vertical pan axis, an optical apparatus mounted on the stage, a pan actuating mechanism, and a tilt actuating mechanism. The optical apparatus includes a frame that supports a magnetic structure and a mirror such that they are pivotable around a horizontal tilt axis. The mirror receives an image directed along an incident axis, and redirects the image along the pan axis, e.g., to a camera that is disposed on or below the base. The pan actuating mechanism engages and rotates the stage into a desired pan direction. The tilt actuating mechanism modulates (alters) a magnetic field applied to the mirror/magnetic structure by, for example, moving a permanent magnet that is mounted on the base.

17 Claims, 14 Drawing Sheets

(56) References Cited

OTHER PUBLICATIONS

Fergus et al. "Removing camera shake from a single photograph," ACM Transactions on Graphics (TOG), vol. 25 (3), pp. 787-794 (2006).

Judy, Jack W. And Richard S. Muller "Magnetically Actuated, Addressible Microstructures," Journal of Microelectromechanical Systems, vol. 6, No. 3, Sep. 1997.

Judy et al. "Magnetic Microactuation of Torsional Polysilicon Structures," Sensors and Actuators A, vol. A54, No. 1-3, pp. 392-397, 1996.

Koga et al. "Electrostatic Linear Micro Actuators with vibrating motion for Pan-tilt Drive of a Micro CCD Camera," $7^{th}$ International Symposium on Micro Machine and Human Science, IEEE, 1996.

Last et al. "Towards a $1mm^3$ Camera—The Field Stitching Micromirror," In Proceedings of Eurosensors 2003, Guimaraes, Portugal, 2003.

Miller et al. "In-Vivo Stereoscopic Imaging System with 5 Degrees-of-Freedom for Minimal Access Surgery," Medicine Meets Virtual Reality Conference (MMVR), Newport Beach, CA, Jan. 16, 2004.

Rentschler et al. "In Vivo Robots for Laparoscopic Surgery," Studies in Health Technology and Informatics, pp. 1-7, 2004.

Yesin et al. "A System of Launchable Mesoscale Robots for Distributed Sensing," SPIE International Symposium on Intelligent Systems and Advanced Manufacturing, Micro Robotics and MicroAssembly (RB11), pp. 19-22, Sep. 1999.

http://www.m4project.org/M4-AnnualReport2004/.

http://www.faulhaber-group.com/n223666/n.html.

http://www.merl.com/people/raskar/deblur/.

\* cited by examiner

MINIATURE LOW COST PAN/TILT MAGNETIC ACTUATION FOR PORTABLE AND STATIONARY VIDEO CAMERAS

FIELD OF THE INVENTION

This invention relates to optimal imaging devices such as video cameras, and in particular to pan/tilt mechanisms for such optimal imaging devices.

BACKGROUND OF THE INVENTION

Growth in the video camera industry as a whole has been fueled by decades of innovation and dramatic increases in integration and reduced costs of video cameras and their subsystems. For example, charge-coupled device (CCD) and CMOS imaging chips now offer mega-pixel resolution. In addition, very recent advances in imaging techniques and deblurring algorithms offer video recording with vibration immunity.

Due to their ever decreasing costs and increasing performance, video cameras now play an almost ubiquitous roll in all levels of society. In the business world, applications of close circuit cameras include video conferencing and security. In law enforcement, video cameras are indispensable surveillance and reconnaissance tools. In the consumer market, camcorders, camera phones, and webcams are fast becoming commonplace household items.

Given the market trends towards miniaturization and integration, it may seem somewhat surprising that pan and tilt functions of small form factor remotely controlled video cameras still rely on traditional slow-moving motor gear technologies. Pan/tilt video cameras, which represent a subset of the video camera market that is particularly relevant to the present invention includes, include a pan/tilt mechanism that allows automated panning and tilting of the camera angle during operation, thereby allowing a user to remotely control the captured image by remotely "aiming" the camera in substantially any direction. Pan/tilt mechanisms typically include a tilt motor for controlling the camera's tilt angle (i.e., the angle of the camera's "aiming" direction relative to a horizontal plane), and a separate pan motor for controlling the camera's pan angle (i.e., the rotational direction of the camera's "aiming" direction relative to a vertical axis).

The most common miniaturized pan/tilt camera systems, commonly referred to as domed PTZ (for pan-tilt-zoom) cameras, use a motor-on-motor gimbal mounting pan/tilt mechanism having a complicated gear train and a domed shaped protective cover. A problem with conventional PTZ cameras is that both the camera (i.e., including the lens and image capturing device) and the tilt motor are supported on a rotating platform driven by the pan motor. The overall size of a typical conventional PZT video camera system is still several inches in diameter. One possible reason such systems have not been miniaturized further is that the pan and tilt angle requirements are quit large (typically greater than 180 degrees of panning and greater than +/−45 degrees of tilt). In addition, because the entire camera must be moved by the tilt motor, and both the camera and tilt motor must be moved by the pan motor, the motional mass of even the latest miniaturized stationary cameras in cell phones is quite large in comparison to the loads miniature technologies such as MEMS can traditionally move. The large mass reduces pan/tilt operating speeds, limit miniaturization of the pan motor, and can introduce cross axis tracking errors due to the motor-on-motor gimbal structure of the PZT pan/tilt mechanism.

Several approaches have been proposed to reduce the mass of pan/tilt mechanism in order to facilitate miniaturization. One approach is to move the camera off of the rotating platform of the pan/tilt mechanism, which involves mounting a lighter weight mirror that is controlled by the tilt motor on the rotating platform, and controlling a tilt angle of the mirror to redirect light to the camera, which is mounted nearby. While this approach reduces the weight supported on the rotating platform, it still requires that the tilt mechanism (i.e., a tilt motor arranged to pivot the mirror) be mounted on the rotating platform, thus limiting miniaturization and operating speed improvement. The weight issue may be addressed by constructing the mirror on a Micro-Electro-Mechanical Systems (MEMS) device, but such MEMS devices typically have a limited range of motion and require a constant power draw in order to maintain a selected tilt position.

To summarize the current state of pan/tilt mechanism technology, the main advantage of the macroscopic motor based pan-tilt mechanisms is that the pan and tilt position can be positioned and maintained using simple pulse driven DC motors or a stepper motors with little or no power draw in a hold position. A large image can be taken at once without having to build up a larger field of view. The main advantage of a MEMS based approach is a compact and possibly lower cost design. However MEMS systems usually require constant power draw so they are not useful for autonomous or remote wireless applications.

What is needed is a low cost pan/tilt actuation platform for use with portable and stationary video camera devices that avoids the problems associated with the various conventional pan/tilt mechanisms described above. In particular, what is needed is a micro mirror-based miniature pan/tilt system that can achieve high bandwidths and a wide range of pan and tilt motion with ideally low current draw in a hold state.

SUMMARY OF THE INVENTION

The present invention is directed to a tilt or pan/tilt apparatus for an optical system (e.g., a fiber optic switch) or an imaging system (e.g., a video camera) in which the tilt operation is performed by modulating an external magnetic field that provides contactless actuation of an optical element (e.g., a mirror) formed integral to or mounted on a magnetic structure. The optical element and magnetic structure are rotatable (pivotable) around a tilt (e.g., horizontal) axis such that modulating the strength and/or field gradient induces a magnetic torque on the magnetic structure that causes rotation of the optical element into a desired tilt position. In the pan/tilt embodiment, the optical element and magnetic structure are attached to a frame that is mounted on a rotating stage (spinning member) that rotates the optical element around a vertical (pan) axis into a desired pan position. The magnetic actuation enables very large ranges of tilt of the optical element. The magnetic actuation facilitates tilt positioning without having to mount a tilt motor on the rotating stage, thereby minimizing the motional mass and reducing the required size of the pan actuating motor, thus facilitating faster pan/tilt operations. When a permanent magnet is used to generate the magnetic field, the tilt actuating motor can be turned off when the desired tilt angle is achieved, producing no static power cost. Another important benefit of the magnetic actuation is its robustness: actuation of the device is contactless, so no electrostatic fields are applied, and hence there are no stringent requirements on device packaging to control moisture and particulates.

In accordance with an embodiment of the present invention, a pan/tilt apparatus includes a base, a stage that is rotatably connected to the base such that the stage is rotatable around a vertical (pan) axis, an optical apparatus mounted on the stage, a pan actuating mechanism, and a tilt actuating mechanism. The optical apparatus includes a frame that is fixedly connected to the stage, a magnetic structure that is connected to the frame such that the magnetic structure is pivotable around a horizontal (tilt) axis relative to the frame, and an optical element that is fixedly connected to the magnetic structure such that the optical element pivots with the magnetic structure around the tilt axis. The optical element (e.g., a mirror or lens) is constructed and disposed to receive an image directed along an incident axis, and to redirect the image along the vertical pan axis, e.g., to a camera 101 that is disposed on or below the base. The pan actuating mechanism includes a motor that is disposed to rotate the stage, e.g., by way of driving a spindle gear. Depending upon pan/tilt application the choice of the type of motor that is used for the pan actuating mechanism depends on cost, form factor, and product lifetime. The technology the motor may use may preferably fall under the category of a rotary DC brush based motor with pulse modulation control, a rotary brushless DC motor typically integrated with a hall sensor for servo control, a rotary ultrasonic motor or friction based piezo-electric motor, a miniature stepper motor, or even a rotary solenoid based or rotary voice coil based motor as is commonly used in the disk drive industry. In addition miniature gear trains (e.g. planetary gears or worm gears) may be used to change the gear ratio to reduce the speed of the motor. The tilt actuating mechanism modulates (alters) a magnetic field applied to the mirror/magnetic structure by, for example, selectively positioning (e.g., translating or rotating) a permanent magnet relative to the mirror/magnetic structure. Alternatively, the magnetic field can be modulated by transmitting a current through a coil, but this would require a constant current to maintain a desired tilt angle. By selectively positioning the permanent magnet relative to the mirror/magnetic structure, the resulting selected change in the magnetic field causes the magnetic structure to pivot around the tilt axis, thereby causing the mirror to assume a selected tilt angle relative to the tilt axis without having to contact the mirror.

According to various embodiments of the invention, the optical apparatus is constructed using a variety of materials and construction techniques. In alternative embodiments, the magnetic structure/mirror comprises a soft ferromagnetic metal (e.g., permalloy or NiCo alloy) or a hard magnetic material (e.g., FePt). The frame can be integrally constructed with the magnetic structure/mirror by, for example, etching a thin magnetic film such that the magnetic structure/mirror are connected to side rails of the frame by way of laser-etched torsion beams that bias the magnetic structure/mirror into a neutral position. Alternatively, torsional beams that connect the magnetic structure to a supporting frame may be made of a very low modulus flexible material such as polyimide than can be spun onto or laminated to one or more layers of magnetic film. The magnetic structure may also be created by building it up using an electroforming process such as electroplating. In order to balance the weight of the magnetic structure and to remove as much as possible its susceptibility to external vibrations, it is desirable to place the torsional beams along the neutral position that forms a line passing through the center of mass of the magnetic structure. In order to allow the magnetic structure to still freely move over a wide range of angular tilt this requires the frame surrounding the magnetic structure be etched all the way through to allow the edges of the magnetic structure to freely move above and below the sides of the frame. In another embodiment the frame does not have to be etched through but consists of a planar substrate that includes cantilevered suspension beams that are formed using stressed metal films such that free ends of the suspension beams bend away from a support substrate when released, e.g., by removing a sacrificial "release" material disposed between the suspension beams and the support substrate. Once the magnetic structure and torsional beams are lifted far enough off of the supporting substrate, the magnetic structure is free to rotate about its center of mass with a large degree of tilt.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in pan/tilt mechanisms for imaging systems such as PTZ video cameras. The following description is presented to enable one of ordinary skill in the art to make and use the invention as provided in the context of a particular application and its requirements. As used herein, directional terms such as "upper", "upwards", "lower", "downward", "front", "rear", are intended to provide relative positions for purposes of description, and are not intended to designate an absolute frame of reference. In addition, the phrases "integrally connected" and "integrally molded" and "formed integral to" are used herein to describe the connective relationship between two portions of a single molded or machined structure, and are distinguished from the terms "connected" or "coupled" (without the modifier "integrally"), which indicates two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
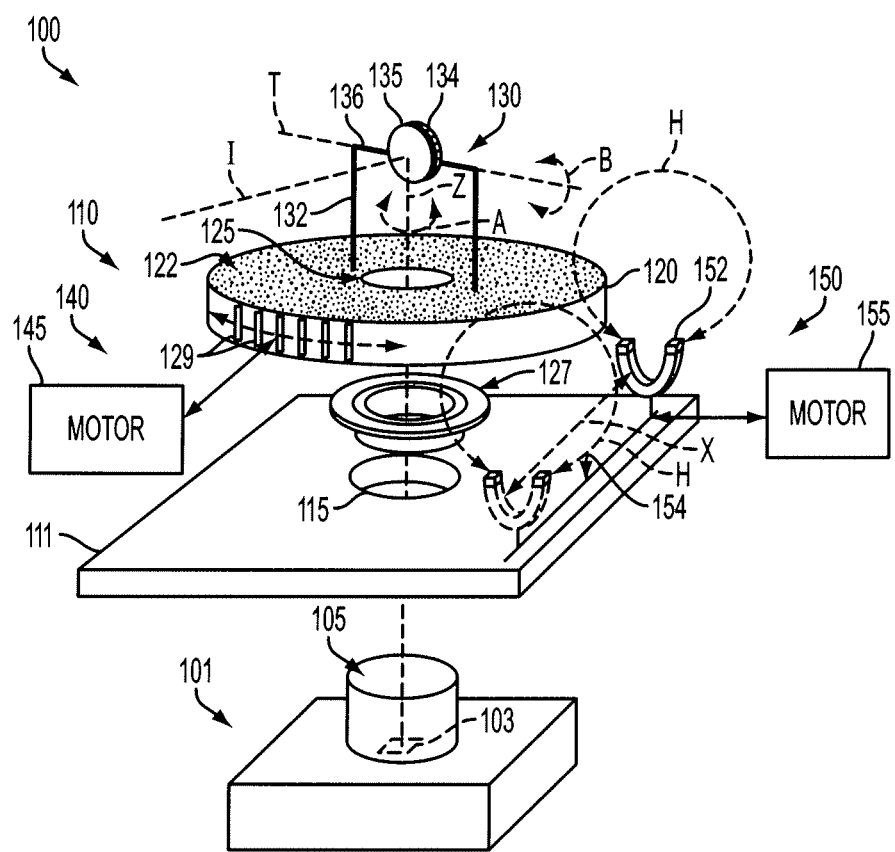
FIG. 1 is an exploded perspective view showing an image capturing system including a camera and a pan/tilt apparatus according to a generalized embodiment of the present invention.

FIG. 1 is an exploded perspective view showing an image capturing system 100 including a camera 101 and a pan/tilt apparatus 110 according to a generalized embodiment of the present invention.

Camera 101 includes an image capturing device 103 (e.g., a charge-coupled device (CCD) or CMOS imaging chip) and a lens 105 that is arranged to direct light passing along an optical axis Z onto image capturing device 103. In one embodiment camera 101 is fixedly connected to a lower surface of a base 111 such that the light captured by camera 101 passes through an opening 115 defined through base 111. In alternative embodiments (not shown), camera 101 may be mounted on the upper surface of base 111. The particular type of camera 101 is not important to the present invention, although the invention is particularly suited to relatively small form factor cameras (e.g., having image capturing devices smaller than approximately ⅓" to ¼" diameter in their aperture).

Pan/tilt apparatus 110 includes base 111, a rotating stage (spinning member) 120 mounted on base 111 such that stage 120 is rotatable around optical axis Z (which is vertically aligned in the figure relative to base 111), an optical apparatus 130 mounted on stage 120, a panning mechanism (panning means) 140 and a tilting mechanism (tilting means) 150.

Rotating stage 120 includes an upper surface 122 defining a central opening 125, and is rotatably supported on base 111 by way of a low-profile, hollow-shaft bearing 127, which is mounted over base opening 115, such that rotating stage 120 is rotatable around optical axis Z, as indicated by dotted arrow A.

Optical apparatus 130 is mounted on stage 120 and serves to direct light downward through central stage opening 125 and base opening 115 to camera 101. In accordance with an aspect of the present invention, optical apparatus 130 includes a frame 132, a magnetic structure 134 that is connected to frame 132 such that the magnetic structure 134 is pivotable around a tilt (horizontal) axis T relative to frame 132 (indicated by dotted arrow B), and a mirror (optical element) 135 that is fixedly connected to a front side of magnetic structure 134. Frame 132 is depicted in a generalized form in FIG. 1, and various types of frames are described with reference to the embodiments disclosed below. Magnetic structure 134 includes a magnetic metal that is formed in a predetermined pattern and secured to frame 132. The magnetic metal material may include any ferromagnetic element such as nickel, iron, cobalt, or any metallic alloy containing any combination of these three magnetic elements together with other additives or impurities compromising small amounts of other elements. Magnetic materials which are most desirable include soft permalloys (eg. NiFe), NiCo alloys, or a Permendur (a FeCo alloy typically containing a small amount of vanadium). Such soft ferromagnetic alloys share several desirable traits. First, they are easily electroplated with very low stress to thicknesses in the range of hundreds of micron with at least one optically flat surface that has minimal bow. Secondly, since these alloys are soft ferromagnetic materials, they have low magnetic coercivity so as to minimize induced magnetic hysteresis when switching the polarity and magnitude of an externally applied field. Mirror 135 is formed using known techniques to receive light beams associated with a captured image that are directed along an incident axis I, and to redirect the light beams (image) along optical axis Z to camera 101. Mirror 135 is integrally connected or otherwise mounted on magnetic structure 134 such that pivoting (tilting) of magnetic structure 134 around tilt axis T by way of a torsion bar 136 (which is suspended between the two legs of frame 132) results in a corresponding pivoting (tilting) of mirror 135 around tilt axis T, which is defined by torsion bar 136. In alternative embodiments, mirror 135 may be replaced with one or more other optical elements (e.g., lenses).

Figure 2A:
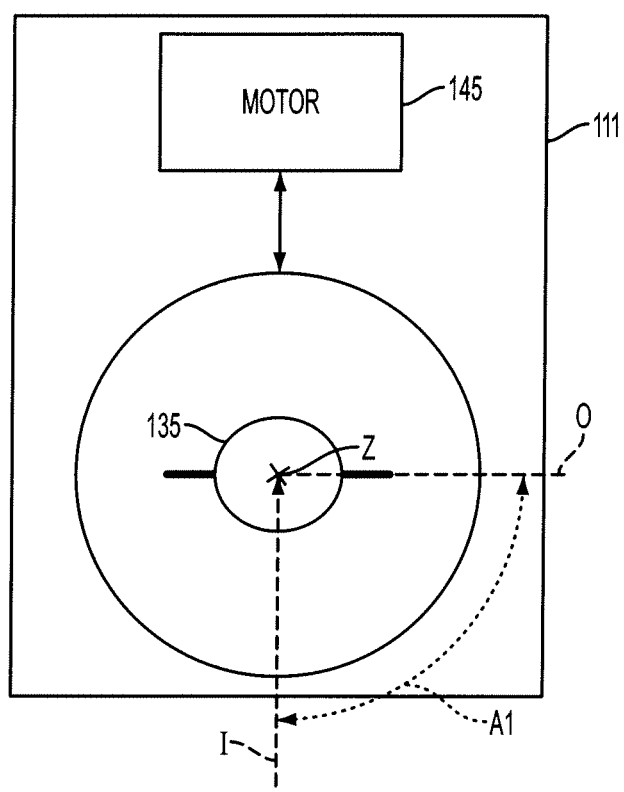
FIGS. 2(A) and 2(B) are top plan views showing a pan operation of the pan/tilt apparatus of FIG. 1.
Figure 2B:
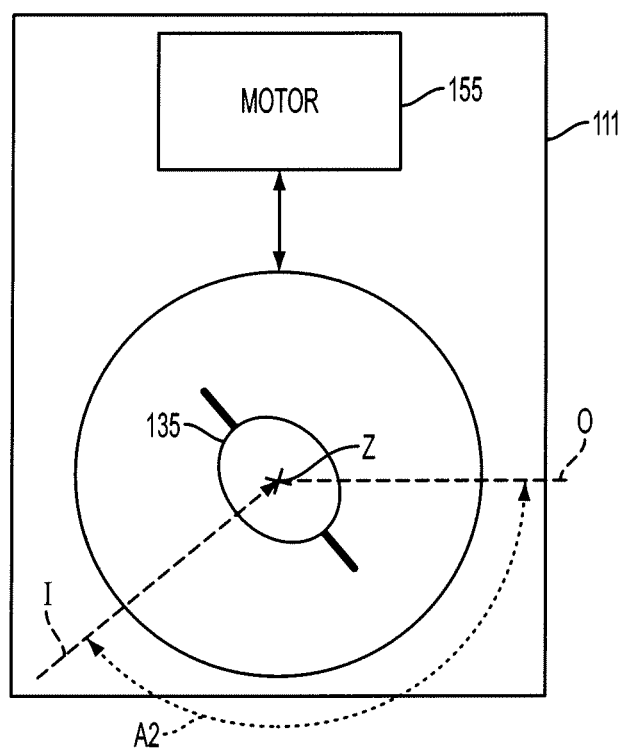

In accordance with another aspect of the present invention, a panning mechanism 140 is provided to control a rotational position A of stage 120 (and, hence, mirror 135) relative to base 111, thereby causing the optical element to assume a selected pan angle relative to optical axis Z. In the generalized embodiment, panning mechanism 140 includes a motor 145 (e.g., a simple geared DC motor or stepping motor) that engages motive structures (e.g., worm gear teeth) 129 disposed on rotating stage 120, and manipulates structure 129 in a way that produces a selected amount of rotation of stage 120 around axis Z. As indicated in FIGS. 2(A) and 2(B), in one specific embodiment, panning motor 145 is fixedly mounted onto base 111, and is controlled from an external source (not shown) to apply a rotating force that selectively pans (rotates) mirror 135 around optical axis Z to a selected pan angle. As indicated in these figures, the panning operation changes the angle of incident light beams I, which are redirected by mirror 135 along optical axis Z. For example, to move from first pan position A1 shown in FIG. 2(A) (i.e., approximately 90° from an arbitrarily selected origin O) to second pan position A2 shown in FIG. 2(B) (i.e., approximately 135° from arbitrary origin O), motor 145 is controlled to rotate stage 120 approximately 45°. Note that, in alternative embodiments, panning motor 145 may be mounted on structure other than on base 111.

Figure 3A:
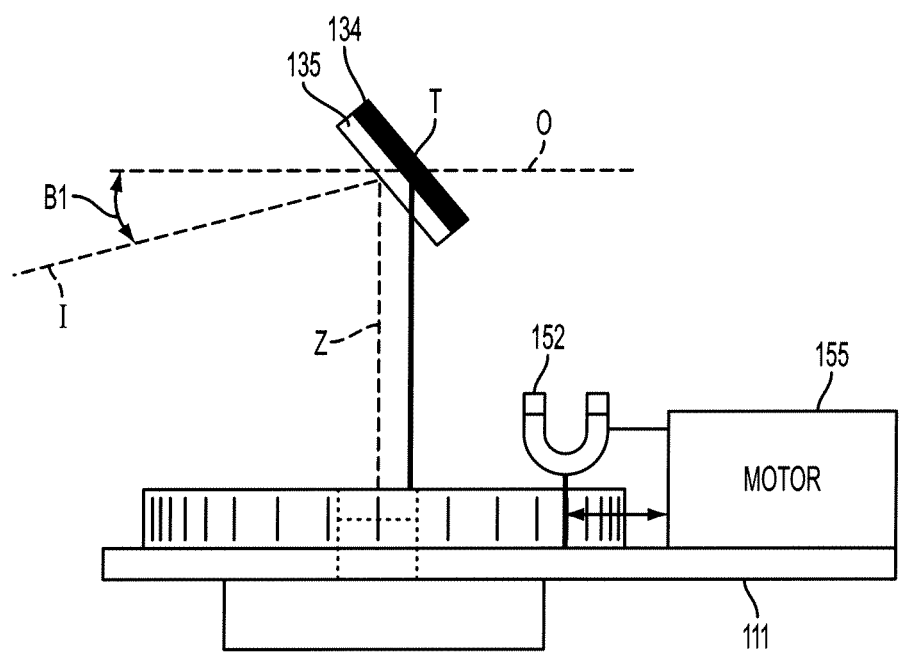
FIGS. 3(A) and 3(B) are side elevation views showing a tilt operation of the pan/tilt apparatus of FIG. 1.
Figure 3B:
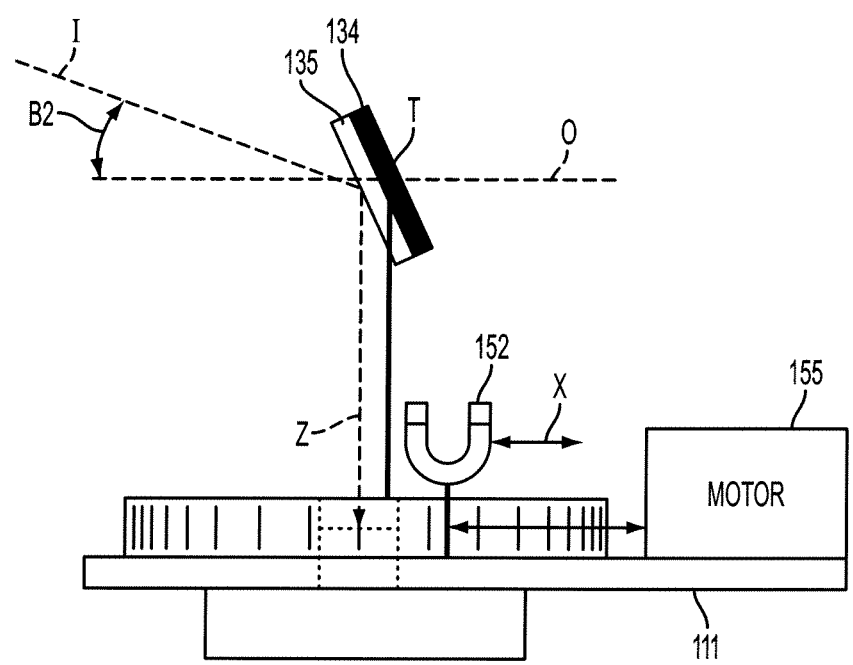

In accordance with yet another aspect of the present invention, tilting mechanism 150 selectively changes a magnetic field H applied to magnetic structure 134, whereby magnetic structure 134 selectively pivots around tilt axis T, thereby causing mirror 135 to assume a selected tilt angle B relative to stage 120. In one embodiment, tilting mechanism 150 includes a permanent magnet 152 that is movable along a track 154 by a linear actuator 155 in order to change (e.g., modulate the strength and/or field gradient) of magnetic field H, as applied to magnetic structure 134. As described above, mirror 135 and magnetic structure 134 are rotatable (pivotable) around tilt axis T such that modulating the strength and/or field gradient of magnet 152 induces a magnetic torque on magnetic structure 134 that causes rotation of mirror 135 into a desired tilt position. As indicated in FIGS. 3(A) and 3(B), in one specific embodiment, motor 155 is fixedly mounted onto base 111, and is controlled from an external source (not shown) to apply a translating force that selectively moves magnet 152 relative to base 111, thereby changing the magnetic torque applied to magnetic structure 134, thus rotating mirror 135 around tilt axis T to a selected tilt angle. In order to realize a small amount of linear motion of magnet 152 in a confined space, many different types of low cost miniaturized linear actuators may be used (e.g. a linear ultrasonic motor based upon piezoelectric effects or a shape memory alloy linear actuator.) As indicated in these figures, the tilting operation changes the angle of incident light beams I, which are redirected by mirror 135 relative to an arbitrary horizontal axis O. For example, to move from first tilt angle B1 shown in FIG. 3(A) (i.e., approximately 30° below arbitrary origin O) to second tilt angle B2 shown in FIG. 3(B) (i.e., approximately 30° above arbitrary origin O), motor 155 is driven to move magnet 152 a predetermined distance X under magnetic structure 134.

Modeling of tilt mechanism 150 is achieved using techniques known in the art. The torque around tilt axis T is produced by the interaction of external magnetic field H exerted by magnet 152 with the induced magnetization of the magnetic structure 134. Because the magnetic structure 134/135 is relatively disk-like in shape, there is a strong amount of shape anisotropy energy which tends to keep the induced magnetization aligned along the surface of the magnetic structure. Due to the relative angle between the induced magnetization in 134/135 and external field H, there is an induced torque which tends to cause the magnetization structure 134/135 to twist around tilt axis T so that the induced magnetization within magnetization structure 134/135 can realign with the external field H. The induced torque results in torsional motion of magnetic structure/mirror 134/135, which is balanced by a mechanical restoring torque provided by frame 132 by way of torsion bar 136. A relationship between a position of permanent magnet 152 relative to magnetic structure/mirror 134/135 for a given pan angle A in order to achieve a desired tilt angle T can be determined using known techniques. A simple and reasonable first order approximation and estimate can be obtained by (a) assuming the external field M is uniform (b) assuming permanent magnet 152 is strong and close enough to magnetic structure/mirror 134/135 to provide a field strength greater that the coercivity of the magnetic structure/mirror where by the magnetization of the magnetic structure 134/135 can be assumed constant in magnitude, and (c) the mirror is suspended using an equivalent of simple torsion bars. Ideally the permanent magnet 152 used to induce a magnetization in the magnetic structure 134/135 is composed of a hard ferromagnetic material with a very high residual magnetic field H often referred to as the flux density of a permanent magnet. Examples of such ferromagnetic materials include but are not limited to sintered Samarium Cobalt, sintered Neodymium Iron Boron, or Alnico.

As set forth above, pan/tilt apparatus 110 facilitates 360° panning by way of pan motor 145 and rotating stage 120, and a very large range of tilt deflection by way of magnet 152, pan motor 155 and magnetic structure 134. By utilizing contactless magnetic actuation to perform the tilt operation, pan/tilt apparatus 110 exhibits tilt positioning without having to mount tilt motor 155 on rotating stage 120, thereby reducing the weight carried on rotating stage 120, and thus reducing the required size of the pan actuating motor 145. Further, when magnet 152 is implemented using a permanent magnetic, tilt actuating motor 145 can be turned off when the desired tilt angle is achieved, producing no static power cost (i.e., all power supplied to pan/tilt apparatus 110 may be turned off once a desired pan/tilt position is achieved). Another important benefit of the magnetic actuation is its robustness—that is, tilt actuation achieves using magnetic fields, so no electrostatic fields are applied, and hence there are no stringent requirements on device packaging.

The following specific embodiments set forth additional details and features of the present invention in reference to specific areas of application, which include (but are not limited to) video cameras, robotics, military surveillance, medical in-vivo imaging systems, microsurgical catheter techniques, and interactive video teleconferencing applications.

Figure 4:
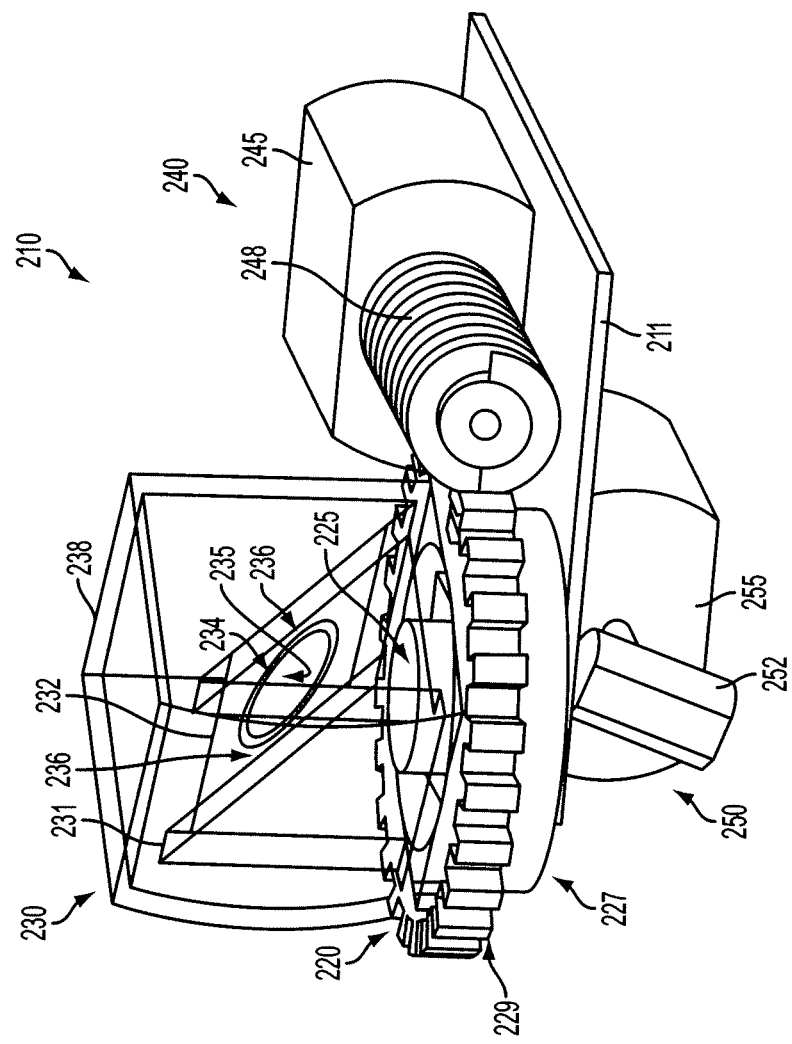
FIG. 4 is a perspective side view showing a pan/tilt apparatus according to another embodiment of the present invention.

FIG. 4 is a perspective view showing a pan/tilt apparatus 210 that is designed for a compact pan/tilt unit for miniaturized image capturing devices according to a second embodiment of the present invention. Similar to the generalized embodiment, pan/tilt apparatus 210 includes base (e.g., a printed circuit board) 211, a rotating stage 220 mounted on base 211, an optical apparatus 230 mounted on stage 220, and a panning mechanism (panning means) 240 and a tilting mechanism (tilting means) 250 that are both mounted on base 211.

Similar to the generalized embodiment, rotating stage 220 defines a central opening 225, through which light is directed by optical apparatus to an image capturing device (not shown) in the manner described above. Rotating stage 220 is rotatably supported on base 211 by way of a low-profile, hollow-shaft bearing spindle 227 which is mounted over a base opening in the manner described above. Bearing spindle 227 includes gear teeth 227 disposed around its peripheral edge. Such miniature hollow shaft bearing spindles are readily available as low-cost mass produced parts commonly used in portable disk drive applications, or at even cheaper prices from injected molded plastic.

Optical apparatus 230 is mounted on stage 220 and serves to direct light downward through central stage opening 225 to a camera or other image capturing device in the manner described above. In accordance with an aspect of the present invention, optical apparatus 230 includes a frame support 231 and a metal frame 232. Metal frame 232, which is described in additional detail below, is a substantially flat member having a magnetic structure 234 and a mirror 235 that are connected to side portions of frame 232 by way of torsion bars 236 such that the magnetic structure 234 is pivotable around a tilt (horizontal) axis defined by torsion bars 236 relative to frame 232. Magnetic structure 234 (and in some instances mirror 235) are formed using a magnetic material. Frame support 231 maintains frame 232 at an approximately 45° angle relative to the upper surface of stage 220, thereby facilitating operation of mirror 235 in a manner similar to that described above with the generalized embodiment.

In accordance with a novel aspect of the present embodiment, frame support 231 and metal frame 232 are mounted inside a transparent container 238 that may be filled with a damping fluid (not shown). Because the motional mass of mirror 235 is small, it is predicted to be sensitive to vibration, and have a resonance frequency in the 100 Hz-1 kHz regime, and may be sensitive to external taping vibrations. In order to damp vibrations and eliminate possible overshoot, transparent container 238 can be filled with a dielectric fluid such as mineral oil or silicone oil. While this damping fluid will lower the resonant frequency of mirror 235, frequency responses above 60 Hz are still adequate because settling times for most pan/tilt systems are on the order of a few seconds. As an alternative damping control, in the absence of damping fluid, the cut out region between the mirror and peripheral frame is made as small as possible, thus limited airflow between them to increase drag. In addition, empirical experiments have shown there is a magnetic damping effect between the induced magnetization of the magnetic structure and the external magnetic field of the permanent magnet.

Panning mechanism 240 is provided to control a panning angle of mirror 235 relative to base 211 by way of hollow-shaft bearing spindle 227. Panning mechanism 240 includes a motor 245 (e.g., miniature stepper motor or pulsed DC brush or brushless motor) having a worm gear 248 that engages gear teeth 229 of spindle 227 such that rotation of worm gear 248 by stepper motor 245 produces a selected amount of rotation of stage 220.

In accordance with a novel aspect of the present embodiment, tilting mechanism 250 includes an external hard ferromagnet (permanent) 252 mounted onto the output shaft of a miniature stepper motor 255, which is fixedly mounted to a lower surface of base 211. Tilt actuation is accomplished by driving stepper motor 255 to turn external ferromagnet 252 below base 211. The rotation of external ferromagnet 252 causes the angle of magnetic structure 234, which is formed from nickel or a soft ferromagnetic material, to rotate about the tilt axis defined by torsional beams (hinges) 236. As in the embodiment above, rotation of magnetic structure 234 causes the surface of mirror 235 to pivot (tilt). With this arrangement, the motor-on-motor geometry utilized in conventional pan/tilt mechanisms is eliminated, dramatically opening up the design space in terms of simplicity, reduced form factor, and cost.

Thus, regardless of the exact details of panning mechanism 240 and the exact type of motor used (ultrasonic or inchworm based, DC brush or brushless, stepper, MEMS electrostatic microdrive, or voice-coil motors could also be used), motor 245 and 255 used for actuating pan and tilt can be shrunk drastically in size as the load these motors need to drive is dramatically reduced in size and weight. In addition, there is much more flexibility in their relative placement as they are no longer coupled together in a motor-on-motor geometry, as in conventional pan/tilt mechanisms. Unlike conventional MEMS approaches, pan motor 245 and hollow-shaft bearing spindle 227 provides a full 360° pan range and tilt motor 255 provides a wide angle of tilt with very little power. In addition, because the motional mass is so small, high speed panning and tilting can be accomplished. Pan/tilt apparatus 210 could possibly fit into a inch cube, yet be made from existing very low cost motors used primarily in cameras and a disk drive hollow shaft bearing, thus making pan/tilt apparatus 210 suitable for many current and yet realized miniature high bandwidth low cost pan/tilt camera applications.

Figure 5A:
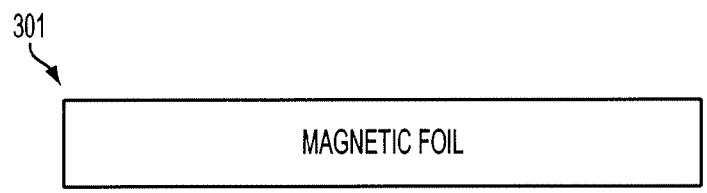
FIGS. 5(A), 5(B), 5(C), 5(D), 5(E) and 5(F) are simplified elevation and cross-sectional views showing a method for forming a magnetic mirror structure of a pan/tilt apparatus according to an embodiment of the present invention.
Figure 5B:
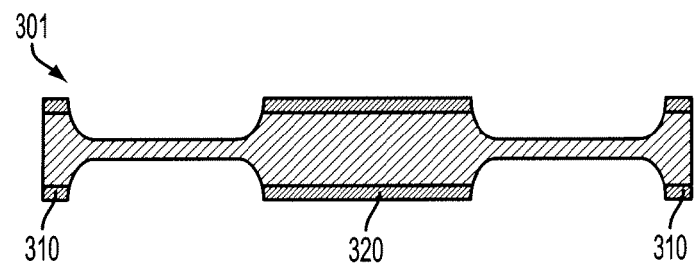
Figure 5C:
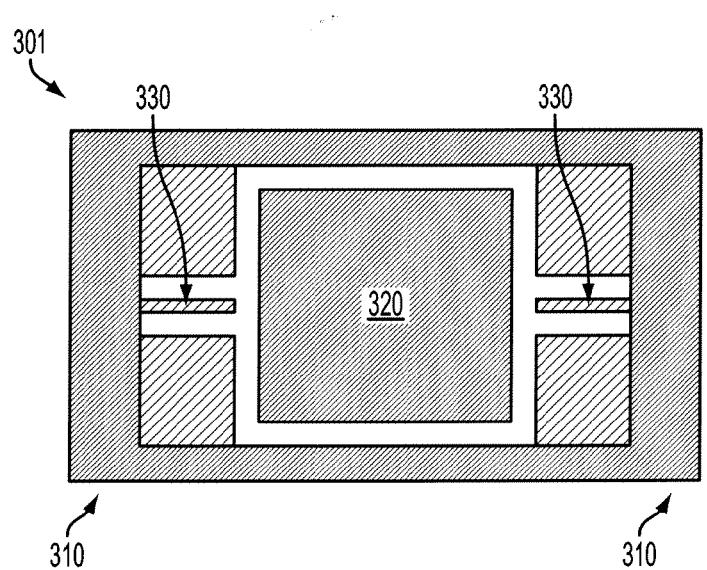
Figure 5D:
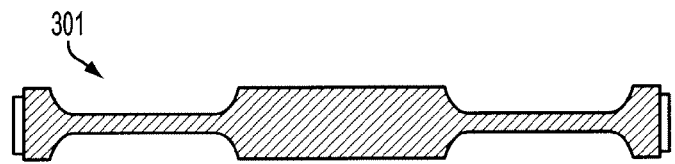
Figure 5E:
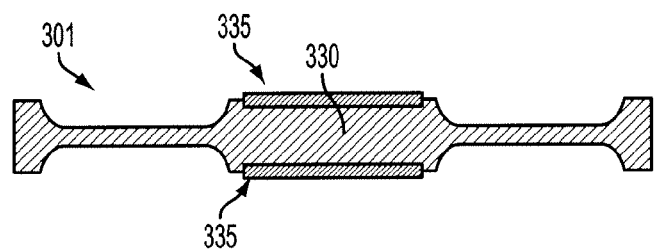
Figure 5F:
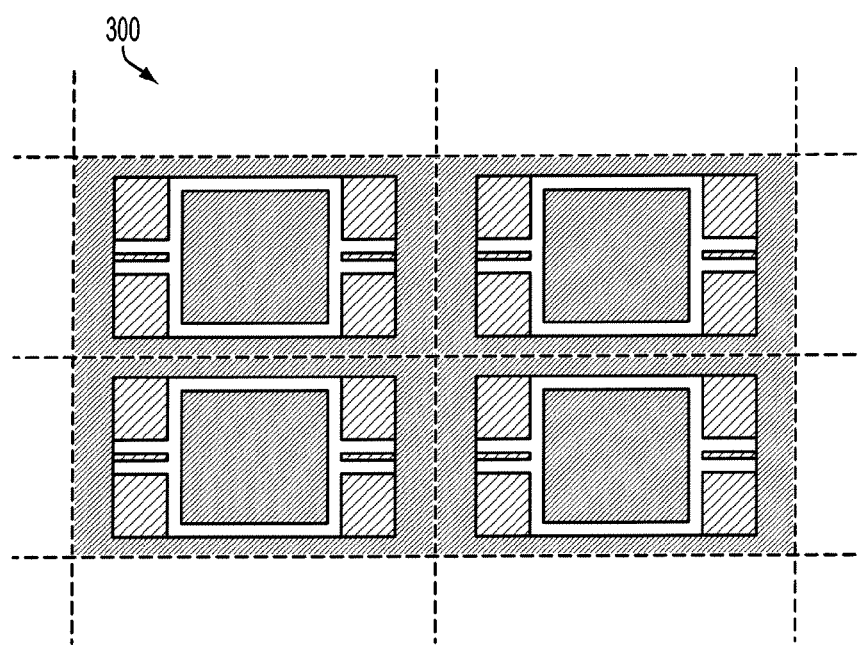

FIGS. 5(A) to 5(F) show a method for producing a mirror frame 300 similar to that utilized in the specific embodiment described above. The process begins with a smooth sheet of a magnetic foil 301 that is in the range of 12-500 microns in thickness (FIG. 5(A)). As indicated in FIG. 5(B), foil 301 is then subjected to photochemical etching using known techniques to define the outer frame portions 310 and central mirror portion 320. Photochemical etching can be done simultaneously on both the front and backsides in order to position the torsional hinges along a line passing through the center of mass of the magnetic structure. FIG. 5(C) is a top view showing a subsequent laser cutting process that is used to define torsion bars (hinges) 330 between outer frame portions 310 and central mirror portion 320. Foil 301 is then optionally subjected to electropolishing (FIG. 5(D)) to reduce surface roughness. Next, a reflective metal layer is deposited on 330, thereby forming mirror surfaces 335 (FIG. 5(E)). Highly reflective metal layers are well known in the art and can include thin layers of silver, aluminum, gold, or an alloy thereof as well as a thin adhesion layer (e.g., Chrome) deposited below the reflection layer to enhance the adhesion of the reflective layer to the underlying magnetic structure. Finally, foil 301 is then singulated into individual mirror frames (dies) 300 (FIG. 5(F)), and cleaned. This process provides a cost effective method for producing mirror frames, and ensures a higher volume of magnetization. It is also possible to create such integrated magnetic structures by using electroforming and/or electroplating techniques to build up magnetic films of a patterned thickness. In addition, the hinges may be made out of a different material other than a magnetic metal in order to increase the range of motion by reducing the modulus of elasticity of the material and eliminating yield deformation at high strains. Thus a patterned layer of thin polyimide could be used to form torsional hinges and laminated between two layers of thin magnetic material. The magnetic structure with mirror quality surface could be formed on both sides using the same photochemical etching techniques described above.

Figure 6:
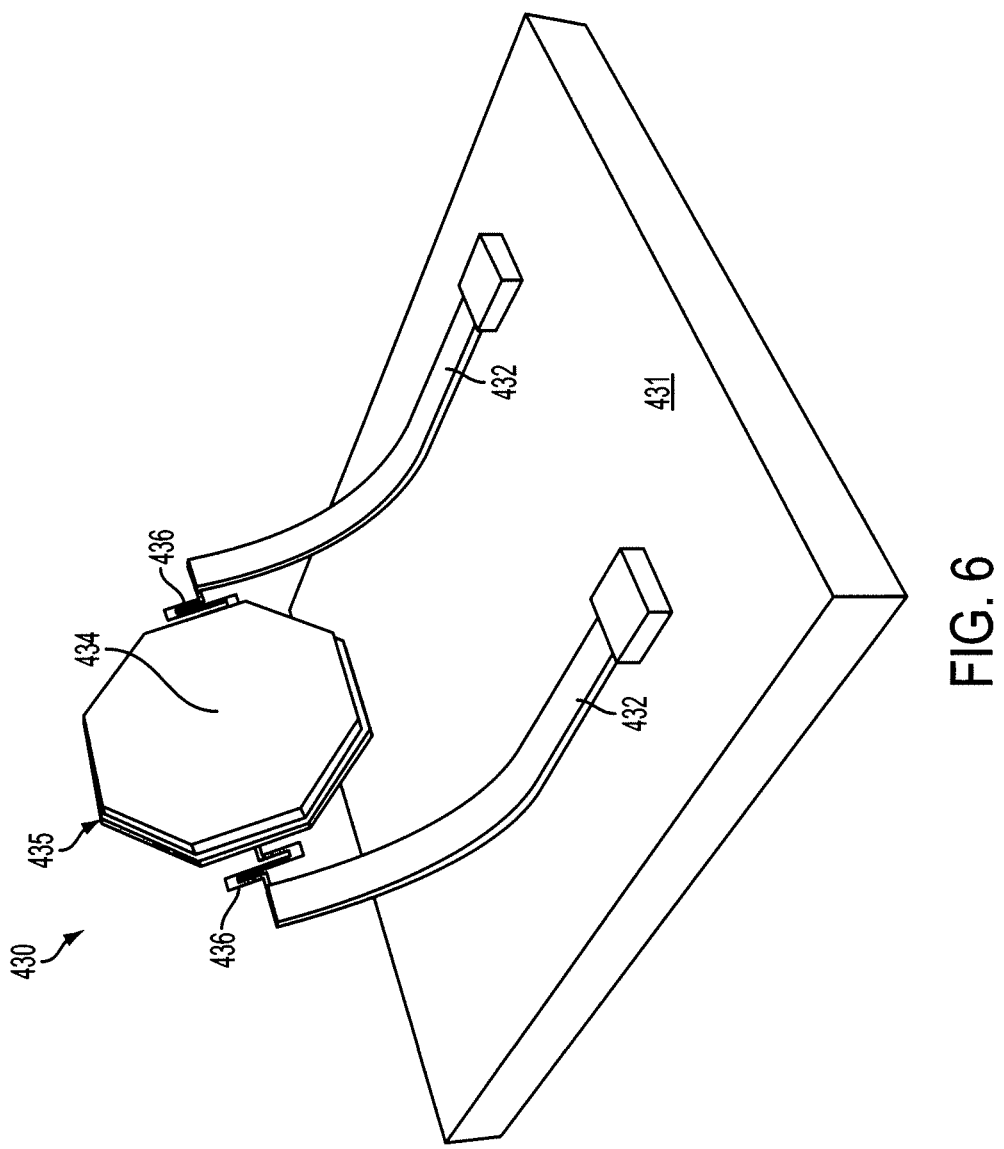
FIG. 6 is a perspective view showing a magnetic structure with torsional hinges that is lifted out of the plane of a supporting substrate using curved stressy metal-based legs to thus allow the magnetic structure a large degree of twisting along the torsional axis and deflection along a tilt direction.

FIG. 6 is a picture showing a portion of a pan/tilt apparatus an optical element 430 formed in accordance with an alternative embodiment of the present invention. Optical element 430 may be used, for example, in place of optical element 230 in pan/tilt apparatus 210, which is described above with reference to FIG. 4. Optical element 430 utilizes a simple low-cost stressed-metal process to form a frame 432 that lifts a magnetic structure 434 and small mirror 435 attached to the frame 432 via a torsional hinges 436 where a high optical flatness mirror 435 is formed on the opposite side (not shown) behind magnetic structure 434. Frame 432 includes several suspension beams that are attached at fixed ends to a glass substrate 431, and magnetic structure/mirror 434/435 are integrally connected to free ends of these beams via torsional hinges 436. As described below, frame 432 is partially released from substrate 431, and internal stresses within the beams lift magnetic structure/mirror 434/435 away from substrate 431. As in the previous embodiments, magnetic structure/mirror 434/435 can then be tilted over a wide angular range by adjusting the position of one or more tiny permanent magnets (not shown) disposed at 1-20 mm distances from magnetic structure/mirror 434/435. FIG. 6 shows magnetic structure/mirror 434/435 lifted almost 45 degrees out of the plane defined by substrate 431. In one embodiment, the magnetic structure/mirror 434/435 consists of an 8 micron thick Nickel layer formed on top of a thin (1 micron) support layer. The suspension beams that form frame 432 have areas on which stressed metal has been deposited according to known techniques. Magnetic structure/mirror 434/435 and portions of the suspension beams are then released from the substrate by removing (etching) a sacrificial amorphous silicon layer using a xenon difluoride release etch. Note that because magnetic structure 434 is electroplated, it will have a fairly rough top surface which would require addition of a polishing step in the fabrication process to use this surface as mirror surface; however, mirror 435, which his located on the backside of magnetic structure 434, will be optically smooth and can be coated prior to release with a high reflectivity metal such as gold, and hence can be used, for instance, in combination with transparent substrate 431.

Figure 7A:
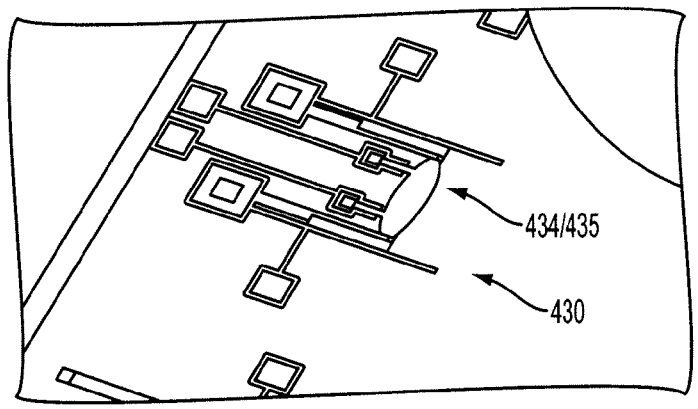
FIGS. 7(A), 7(B) and 7(C) are enlarged photographs showing the stressy metal-based optical element during operation.
Figure 7B:
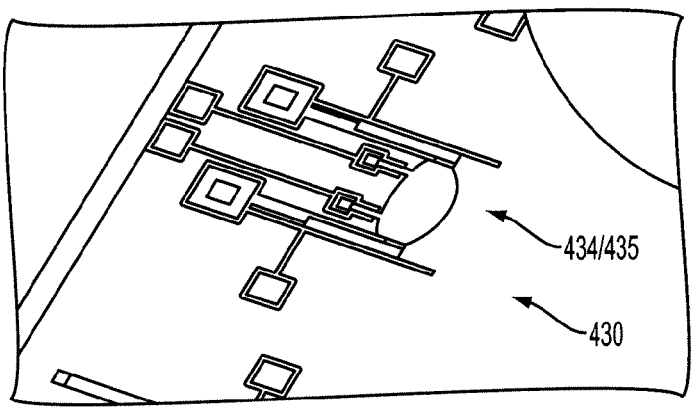
Figure 7C:
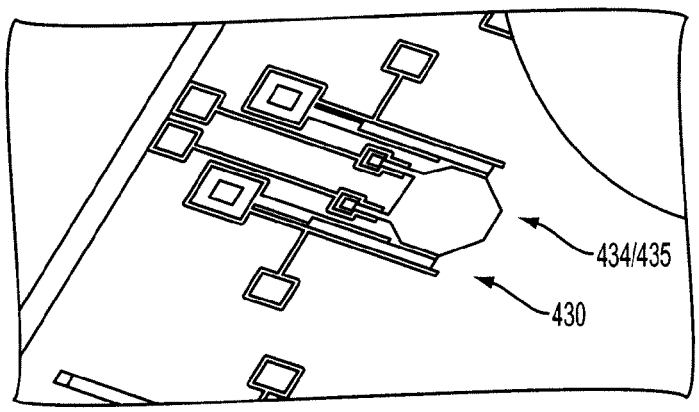

FIGS. 7(A), 7(B) and 7(C) are enlarged photographs (microscope screenshots) of an optical element 430 when a small, disc type, rare earth metal permanent magnet (NdFeB) was brought in the vicinity (a few mm's) of magnetic structure/mirror 434/435 and translated along an axis parallel to the surface of substrate. The magnet exerts a force on the soft ferromagnetic nickel layer making up magnetic structure/mirror 434/435, and tends to align the plane of the mirror's body to the magnetic field lines surrounding the magnet. FIGS. 7(A), 7(B) and 7(C) depict actuation of structure/mirror 434/435 in response to movement of the magnet (not shown). FIG. 7(A) shows magnetic structure/mirror 434/435 at a tilt angle of approximately 70°, FIG. 7(B) shows magnetic structure/mirror 434/435 at a tilt angle of approximately 53°, and FIG. 7(C) shows magnetic structure/mirror 434/435 at a tilt angle of 0° (i.e., pressed against the upper surface of substrate 431).

FIGS. 8(A) to 8(G) depict another process for generating optical element 430 having micromirrors that are possibly better suited for endoscopic and boroscopic applications. Because the thickness of the magnetic structure/mirror 434/435 is limited to thick film photoresist/SU8 and by plating uniformity, this process is most likely limited to small mirrors up to roughly 1.5 mm diameter in size or less.

Figure 8A:
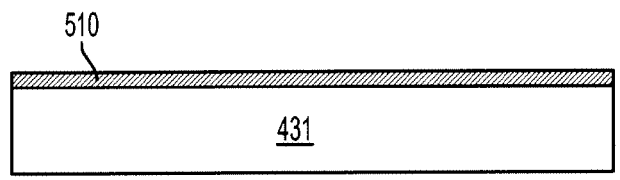
FIGS. 8(A), 8(B), 8(C), 8(D), 8(E), 8(F) and 8(G) are simplified cross-sectional views showing a method for fabricating the stressy metal-based optical element of FIG. 6.
Figure 8B:
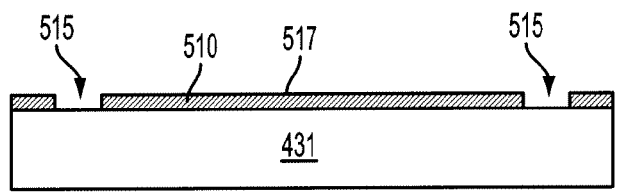

Referring to FIG. 8(A), the process begins with un-annealed glass substrate 431 and includes depositing an a-Si release material layer 510 using known PECVD techniques. As shown in FIG. 8(B), release material layer 510 is then patterned and dry etched to provide vias (openings) 515 that expose portions of the upper surface of substrate 431. A thin adhesion and mirror layer 517 is deposited. Such a layer could consist of Chrome or Titanium for adhesion and Gold, Aluminum, or Silver for reflection.

Figure 8C:
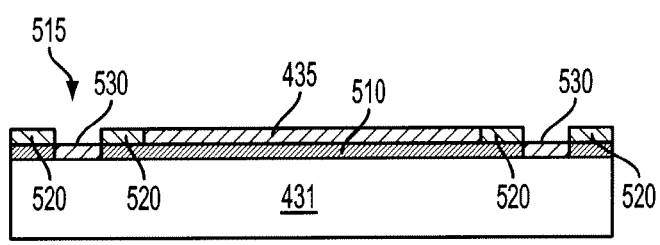

Referring to FIG. 8(C), a mask 520 is then patterned over release material layer 510 and Nickel is electroplated through windows in the mask 520. The electroplated Nickel is used to form mirror 435, and mask 520 is aligned with openings 515 to facilitate the formation of support beam posts (fixed ends) 530 that extend substantially to the upper surface of substrate 431 (i.e., by way of the adhesion material).

Figure 8D:
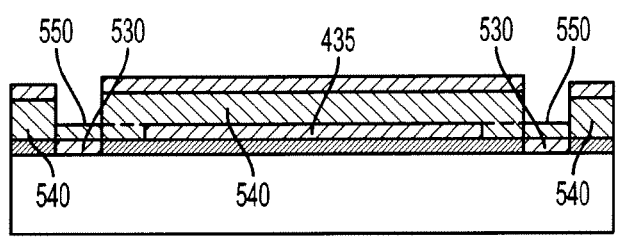
Figure 9:
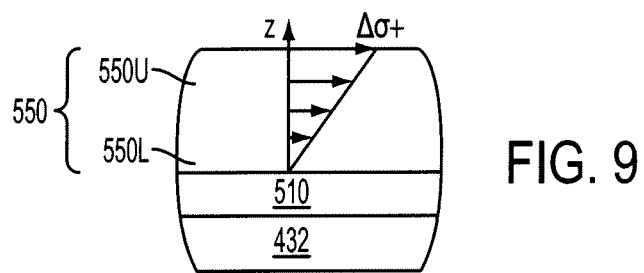
FIG. 9 is a cross-sectional view showing the formation of a support beam of the stressy metal-based optical element during the fabrication method of FIGS. 8(A) to 8(G)

As shown in FIG. 8(D), a support beam mask 540 is then patterned over mirror 435 such that trench-like windows (not shown) are defined that extend from the upper surfaces of support beam post 530 to regions located adjacent to mirror 435 (i.e., in the shape of the support arms forming frame 432 in FIG. 6). Spring film 550 is then formed in a controlled manner through the trench-like windows formed in support beam mask 540 to form support beams that extend from posts 530 to mirror 435. As indicated in FIG. 9, spring film 550 is formed (e.g., sputtered or plated) such that lowermost portions 550L (i.e., the film material located closest to release material layer 510) has a higher internal compressive stress than uppermost portions 550U (i.e., the film material located furthest to release material layer 510), thereby forming internal stress variations in the growth direction (e.g., stress gradient $\Delta\sigma+$, which increases in the direction perpendicular to the upper surface of substrate 431). The thickness of spring film 550 is determined in part by the selected spring material, formation technique, desired spring constant, and shape of the final spring structure.

Sputter-based methods for forming spring film 550 such that it has a suitable stress gradient $\Delta\sigma+$ (see FIG. 9) are taught, for example, in U.S. Pat. No. 3,842,189 (depositing two metals having different internal stresses) and U.S. Pat. No. 5,613,861 (e.g., single metal sputtered while varying process parameters), both of which being incorporated herein by reference in their entirety. In one embodiment, stress-engineered spring material film 550 includes one or more metals suitable for forming a spring structure (e.g., one or more of molybdenum (Mo), a "moly-chrome" alloy (MoCr), tungsten (W), a titanium-tungsten alloy (Ti:W), chromium (Cr), nickel (Ni) and a nickel-zirconium alloy (NiZr)).

According to another embodiment, a spring film 550 (e.g. Ni, Cu, alloys) is deposited onto a seedlayer (e.g. Au, Ni) using electroplating or electroless plating techniques. Similar to the sputtered embodiment described above, in one embodiment the process parameters are changed during plating to generate a suitable stress gradient $\Delta\sigma+$, although it is possible to form a suitable film without changing the process parameters. According to an aspect of the present embodiment, a plating chemistry is used that deposits at least two elements into the film that can subsequently be transformed to an intermetallic phase using, for example, the annealing processes described herein to bend the resulting spring structure such that its tip is positioned at the target distance away from the underlying substrate surface. In one specific embodiment, an Au seed layer is lithographically patterned and then sequentially exposed to an $Ni_3P$ (first) solution, which forms a relatively compressive lower spring layer portion on the release layer, and then an $Ni_3B$ (second) solution, which forms a relatively tensile upper spring layer portion on the lower spring layer portion. Other plated spring types may include Cu with various hardening materials added thereto that are formed using either electroless plating or electroplating. The Cu plating process is performed such that a stress-gradient is formed in the plated material in the plating direction (i.e., similar to that described above for the sputtered embodiments) by, for example, either varying a parameter during the plating process (e.g. changing current density while plating), or using two different plating baths with different stress characteristics. In yet another alternative embodiment, the plating may be performed using electroplating techniques (i.e., after depositing a suitable seed material (e.g., Au; not shown) onto the upper surface of the release material). Note that release layer 210 must be a conductive material, such as Ti, in order for electroplating to be performed. Note also that the plated material may be formed as a continuous layer and then etched as described below to form individual spring structures, or individual spring structures may be formed directly by plating through a hard mask.

Figure 8E:
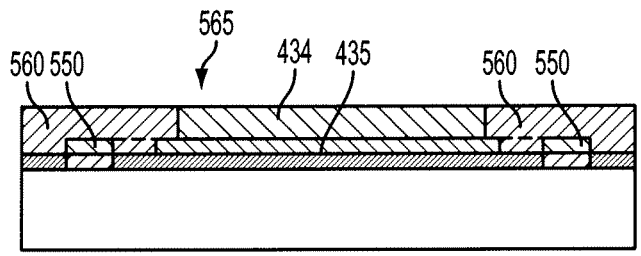

Referring to FIG. 8(E), the support beam mask and spring material formed thereon are then removed using well-know lift-off techniques, and a thick photoresist magnetic structure mask 560 is patterned over mirror 435 that is used to form magnetic structure 434. In one embodiment, magnetic structure 434 is formed by electroplating Ni through the opening in mask 560.

Figure 8F:
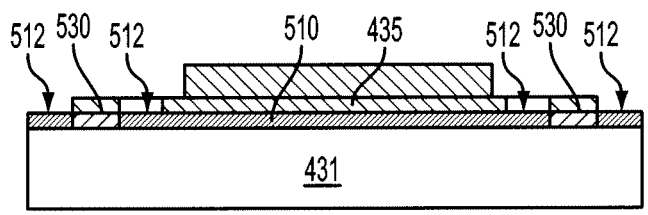
Figure 8G:
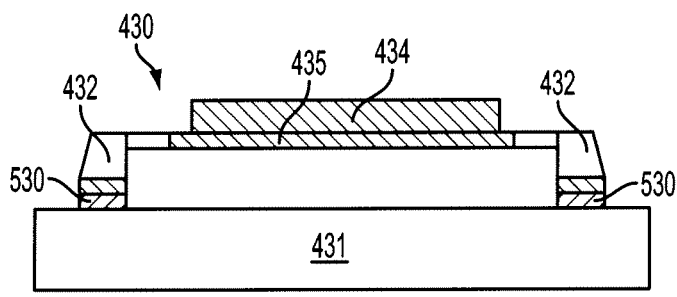

As shown in FIG. 8(F), all remaining mask material and portions of the Ti/Au are then removed to expose upper surface portions 512 of a-Si sacrificial release material layer 510 that surround the suspension legs and magnetic structure/mirror 434/435. An $XeF_2$ etchant is then used to remove release material layer 510, thereby partially releasing the suspension legs of frame 432 and magnetic structure/mirror 434/435 from substrate 431, causing the internal stresses within the spring material to lift magnetic structure/mirror 434/435 away from substrate 431 as shown in FIG. 8(G). Note the substrate 431 may then be diced to form individual optical apparatus 430 before or after the $XeF_2$ release step.

Figure 10:
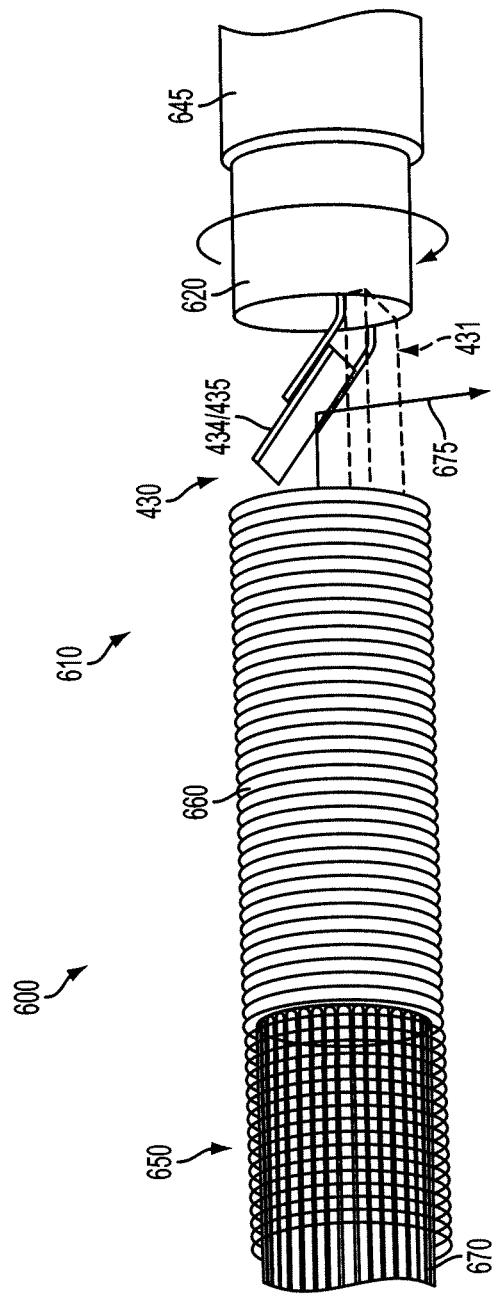
FIG. 10 is a perspective view showing an endoscopic image capturing system according to a specific embodiment of the present invention.

FIG. 10 is a perspective view showing a portion of an image capturing system 600 for endoscopic applications including a pan/tilt mechanism 610 that utilizes optical apparatus 430 to direct light to and from a GRIN lens 660. Substrate 431 of optical apparatus 430 is mounted on a stage 620 that is turned by a panning micromotor 645. Tilt operations (i.e., deflection of magnetic structure/mirror 434/435) are facilitated by a very high N turn coil 650 that surrounds GRIN lens 660 to generate a very localized magnetic field gradient that is modulated to produce tilting of mirror 435 in the manner described above. The light signals are transmitted to and from GRIN lens 660 by an optical bundle 670. To facilitate the endoscopic application, pan motor 645 and coil 650 are arranged along a very small diameter cylindrical axis. While the field strength of coil 650 will not approach that of a permanent magnet, coil 650 can be placed around the insulating glass GRIN lens or integrally formed by laser etching a helical coil shape onto a metallized GRIN lens. The GRIN lens and coil assembly is place right next to the stressed metal micromirror so as to maximize the strength of the field produced and the stressed metal magnetic micromirror can be made with reduced torsional stiffness due to the tiny mass of magnetic structure/mirror 434/435. The entire pan/tilt apparatus of device 600 requires no difficult non-planar wire bonding, just a single gluing step of micromirror substrate 431 to stage 620, and can fit into a cylinder having a diameter that is less than 2.0 mm.

Figure 11:
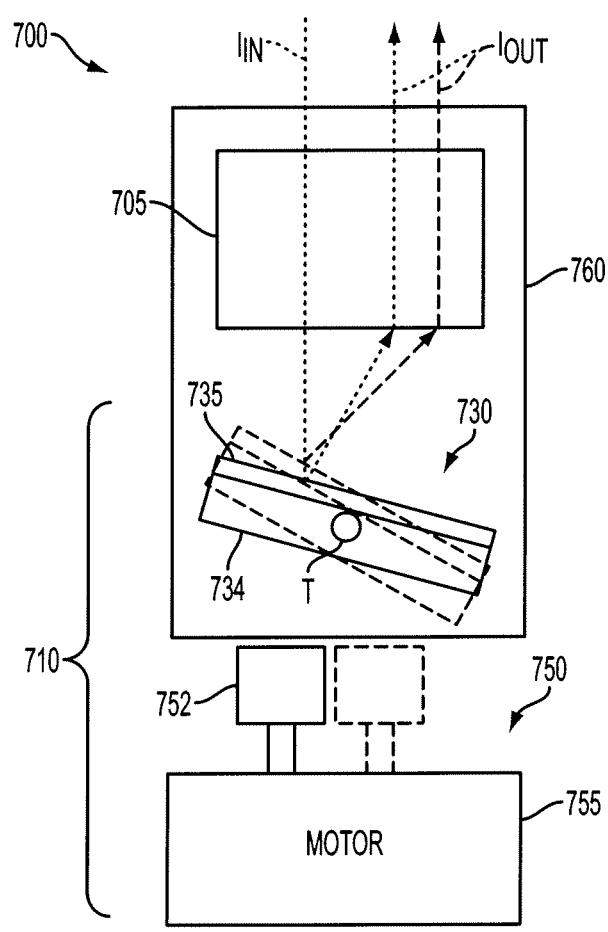
FIG. 11 is a simplified diagram showing a non-contact tilt apparatus for an optical system according to another embodiment of the present invention.

Although the present invention is described with reference to a combined pan/tilt apparatus, the novel non-contact latchable (i.e., no power draw in any hold position) mirror tilting mechanism of the present invention may be utilized independent of the pan/tilt arrangement described above. For example, in the field of fiber optics, latchable means for maintaining the position of a mirror even when power is shut off is desirable for switching or routing applications, but is very difficult to implement in small form factor devices. FIG. 11 depicts a simplified optical switching apparatus 700 including an optical system (e.g., a transceiver) 705 and a tilt mechanism 710 in which an input light beam $I_{IN}$ generated by optical transceiver 705 is directed onto an optical apparatus 730 of tilt mechanism 710, and an exit light beam $I_{OUT}$ reflected by optical apparatus 730 is directed back to optical device 705 (or to another optical device). Similar to previous embodiments, optical apparatus 730 includes a magnetic structure 734 and mirror surface 735 that are tiltable around an axis T (shown in end view) and supported by a frame (not shown). As depicted, the tilt angle of mirror 735 determines the location of output beam $I_{OUT}$, thereby allowing selective switching between, e.g., two or more output fiber optic cables. As in previous embodiments, tilting of magnetic structure 734 and mirror surface 735 is achieved by a tilting mechanism (tilting means) 750 which includes a permanent magnet 752 and a motor (means for positioning) 755 that is operably disposed to move magnetic 752 in a controllable linear or rotation fashion. This non-contact tilting arrangement is highly desirable because it allows optical apparatus 730 to be surrounded or partially surrounded by an enclosure 760 that may be hermetically sealed, whereas motor 755, which often has materials which are incompatible with hermetic sealing, may be situated inside or outside of enclosure 760. Many different types of miniature motors can be used to move permanent magnet 752 in order to change the local magnetic field applied to magnetic structure 734. In particular, motor 752 could consist of a compact piezoelectric inchworm device for linear translation of magnet 752, or a precision stepper motor for angular rotation of the polls of magnet 752. If precision control of the position of the tilt of the magnetic structure/mirror is require, a low cost small form factor magnetic hall position sensor can be used to provide a feedback signal either inside or outside the enclosure for ensuring precision adjustment of the tilt angle of the magnetic structure. Such a non-contact latchable tilting mechanism may be very desirable for fiber optic switching applications with one or more input or output rays of light.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A pan/tilt apparatus for an image capturing system, the apparatus comprising:
   a base;
   a stage rotatably connected to the base such that the stage is rotatable around a first axis relative to the base;
   an optical apparatus mounted on the stage including:
   a frame,
   a magnetic structure that is connected to the frame such that the magnetic structure is pivotable around a second axis, and
   an optical element that is fixedly connected to the magnetic structure such that the optical element pivots with the magnetic structure around the tilt axis, the optical element being disposed to receive an image directed along an incident axis, and to redirect the image along the first axis;
   panning means for controlling a rotational position of the stage relative to the base, thereby causing the optical element to assume a selected pan angle relative to the first axis; and
   tilting means for controlling a tilt angle of said optical element by altering a magnetic field applied to the magnetic structure, whereby a selected change in the magnetic field generated by said tilting means causes the magnetic structure to pivot around the second axis, thereby causing the optical element to assume a selected tilt angle relative to the second axis, wherein the tilting means is mounted entirely on the base and off of the stage such that the tilting means does not rotate around the first axis with the stage when the stage is rotated around the first axis by said panning means.

2. The pan/tilt apparatus according to claim 1, wherein the tilting means comprises both a permanent magnet and a motor for translating or rotating the orientation of the permanent magnetic relative to the magnetic structure in order to induce a change in the magnetic field applied to the magnetic structure.

3. The pan/tilt apparatus according to claim 2, wherein the motor is mounted on the base and operably disposed to position the permanent magnet relative to the magnetic structure.

4. The pan/tilt apparatus according to claim 1, wherein at least one of the magnetic structure and the optical element comprises a low coercivity soft ferromagnetic material.

5. The pan/tilt apparatus according to claim 1, wherein at least one of the magnetic structure and the optical element comprises a hard high coercivity ferromagnetic material.

6. The pan/tilt apparatus according to claim 1, wherein the magnetic structure and the optical element are connected to the frame by torsional beams.

7. The pan/tilt apparatus according to claim 6 wherein the torsional beams comprise a very low modulus flexible material.

8. The pan/tilt apparatus according to claim 1, wherein the frame and at least one of the magnetic structure and the optical element comprise an integral sheet of metal.

9. The pan/tilt apparatus according to claim 1, wherein the frame comprises cantilevered suspension beams.

10. The pan/tilt apparatus according to claim 9, wherein the cantilevered suspension beams comprise a spring film including first layer portions having a higher internal compressive stress than second layer portions, thereby forming internal stress variations.

11. The pan/tilt apparatus according to claim 2 wherein said permanent magnetic is actuated rotationally by a rotary stepper motor.

12. The pan/tilt apparatus according to claim 2 wherein said permanent magnetic is translated in position by a linear inchworm motor.

13. The pan/tilt apparatus according to claim 1,
   wherein said stage includes motive structures fixedly mounted thereon, and
   wherein panning means comprises a motor that engages the motive structures.

14. The pan/tilt apparatus according to claim 13,
   wherein said stage comprises a hollow-shaft bearing spindle having gear teeth disposed around a peripheral edge, and
   wherein panning means comprises a motor including a worm gear engaging the gear teeth.

15. The pan/tilt apparatus according to claim 13, further comprising a transparent container mounted on the stage and containing both the optical apparatus and a damping fluid.

16. The pan/tilt apparatus according to claim 13, wherein the stage, the optical apparatus, the panning means and the tilting means are disposed within a cylindrical region having a diameter of less than 5 millimeters.

17. An image capturing system comprising:
an image capturing device having an optical axis; and
a pan/tilt imaging system comprising:
a base fixedly connected to the image capturing device;
a stage rotatably connected to the base such that the stage is rotatable around the optical axis;
an optical apparatus mounted on the stage including:
a frame,
a magnetic structure that is connected to the frame such that the magnetic structure is pivotable around a tilt axis, and
a mirror that is fixedly connected to the magnetic structure such that the mirror pivots with the magnetic structure around the tilt axis, the mirror being disposed to receive an image directed along an incident axis, and redirect the image along the first axis;
a panning mechanism for controlling a rotational position of the stage relative to the base, thereby causing the optical element to assume a selected pan angle relative to the optical axis; and
a tilting mechanism for controlling a tilt angle of said optical element by altering a magnetic field applied to the magnetic structure, whereby a selected change in the magnetic field generated by said tilting mechanism causes the magnetic structure to pivot around the second axis, thereby causing the mirror to assume a selected tilt angle relative to the tilt axis, wherein the tilting mechanism is mounted entirely on the frame such that the tilting means does not rotate around the first axis with the stage when the stage is rotated around the first axis by said panning means.

* * * * *